(12) United States Patent
Denkin et al.

(10) Patent No.: US 6,275,313 B1
(45) Date of Patent: Aug. 14, 2001

(54) RAMAN GAIN TILT EQUALIZATION IN OPTICAL FIBER COMMUNICATION SYSTEMS

(75) Inventors: Nathan Myron Denkin, Aberdeen Township, Monmouth County; Martin Zirngibl, Middletown Township, Monmouth County, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/017,910

(22) Filed: Feb. 3, 1998

(51) Int. Cl.$^7$ .......................... H04J 14/02; H04B 10/00; H04B 10/02

(52) U.S. Cl. ...................... 359/124; 359/127; 359/161; 359/177

(58) Field of Search ..................... 359/124, 125, 359/126, 127, 177, 173, 161

(56) References Cited

U.S. PATENT DOCUMENTS

| | | | |
|---|---|---|---|
| 5,532,868 | * 7/1996 | Gnauck et al. | 359/332 |
| 5,675,432 | * 10/1997 | Kosaka | 359/341 |
| 5,717,510 | * 2/1998 | Ishikawa et al. | 359/161 |
| 5,907,420 | * 5/1999 | Chraplyvy et al. | 359/179 |
| 5,923,450 | * 7/1999 | Dugan et al. | 359/127 |
| 5,995,275 | * 11/1999 | Sugaya | 359/341 |
| 6,023,366 | * 2/2000 | Kinoshita | 359/341 |

OTHER PUBLICATIONS

A.R. Chraplyvy, "Limitations on Lightwave Communications Imposed by Optical–Fiber Nonlinearities", JTL, vol. 8, pp. 1548–1557, 1990.

A.R. Chraplyvy, "Optical power limits in Multichannel Wavelength–Division–Multiplexed Systems due to Stimulated Raman Scattering", Electron. Lett., vol. 20, 1984, pp. 58–59.

A.K. Srivastava et al., "Fast–Link Control Protection of Surviving Channels in Multiwavelength Optical Networks", IEEE PTL, vol. 9, Dec. 1997 issue.

Y. Aoki, "Properties of Fiber Raman Amplifiers and Their Applicability of Digital Optical Communication Systems", J. of Lightwave Technology, vol. 6, 1988, 1225–1239.

M.E. Marhic, F.S. Yang, L.G. Kazovsky, "Cancellation of SRS crosstalk in WDM optical comunication systems by series of parallel techniques", LEOS'97, paper MC2, 1997.

* cited by examiner

Primary Examiner—Leslie Pascal
Assistant Examiner—Dalzid Singh
(74) Attorney, Agent, or Firm—John A. Caccuro

(57) ABSTRACT

The spectral distortion introduced by stimulated Raman scattering (SRS) in an optical fiber transmission system has been determined to always be linear on a dB/nm scale and depend solely on the total input power and not on the input power distribution. By maintaining the total input power to the fiber constant, the resulting Raman gain tilt may be compensated for or canceled by using an optical filter.

14 Claims, 3 Drawing Sheets

RAMAN GAIN TILT EQUALIZATION IN OPTICAL FIBER COMMUNICATION SYSTEMS

TECHNICAL FIELD OF THE INVENTION

This invention relates to optical communication systems and, more particularly, to apparatus for and method of controlling Raman gain tilt in an optical fiber communication system.

BACKGROUND OF THE INVENTION

Stimulated Raman Scattering (SRS) is an important non-linear effect in fibers that can be used to build Raman amplifiers, but that also degrades Wavelength Division Multiplexed (WDM) signals due to channel-to-channel cross talk and spectral distortion (gain tilt) (see e.g., A. R. Chraplyvy, "Optical power limits in Multichannel Wavelength-Division-Multiplexed Systems due to Stimulated Raman Scattering," Electron. Lett., Vol. 20, 1984, pp. 58–59.). The general case of SRS in a multi-channel system cannot be solved analytically (see S. Tariq, J. C. Palais, "A Computer Model of Non-Dispersion-Limited Stimulated Raman Scattering in Optical Fiber Multiple-Channel Communications," J. of Lightwave Technology, vol. 11, 1993, 1914–1924). Analytical solutions, however, have been found under the assumptions of negligible signal cross-coupling, negligible pump depletion and/or constant Raman coupling coefficient (see e.g., Y. Aoki, "Properties of Fiber Raman Amplifiers and Their Applicability of Digital Optical Communication Systems," J. of Lightwave Technology, vol. 6, 1988, 1225–1239). In the case of a Raman amplifier with a strong pump signal and relatively weak signal channels spectrally far removed from the pump, these are certainly valid assumptions. However, for a system with many densely packed WDM channels with a non-uniform power distribution, the above assumptions no longer accurately reflect the physics of the problem.

Since WDM systems are being widely deployed today, what is needed is a technique for compensating for the Raman gain tilt in such WDM systems.

SUMMARY OF THE INVENTION

In accordance with the present invention, we have recognized that the spectral distortion introduced by stimulated Raman scattering (SRS) in an optical fiber transmission system is approximately linear on a dB/nm scale and depends solely on the total input power and not on the input power distribution. By maintaining the total input power to the fiber constant, the Raman gain tilt can be compensated for or canceled by using an optical filter.

More particularly, the present invention controls the Raman gain tilt of an optical fiber communication system by sending a plurality of optical signals at a combined power level Ps over the fiber and by sending an optical control signal at a power level Pc over the fiber such that the total power Ps plus Pc is maintained at a predetermined value irrespective of the number of said plurality of optical signals sent over the fiber.

According to another aspect of our invention, an optical fiber communication system is disclosed that comprises (1) a first optical apparatus for transmitting a plurality of optical signals over an optical fiber at a combined power level that does not vary as a function of the number of optical signals transmitted over the fiber and (2) a second optical apparatus for filtering the optical signals using an optical filter having a fixed wavelength response to compensate for a gain tilt introduced to the optical signals transmitted over the fiber.

The present invention can be utilized with WDM or other type of optical communications systems that use optical signals that may be intensity, amplitude, frequency or phase modulated.

DETAILED DESCRIPTION

In the following description, each item or block of each figure has a reference designation associated therewith, the first number of which refers to the figure in which that item is first located (e.g., 101 is located in FIG. 1).

Figure 1:
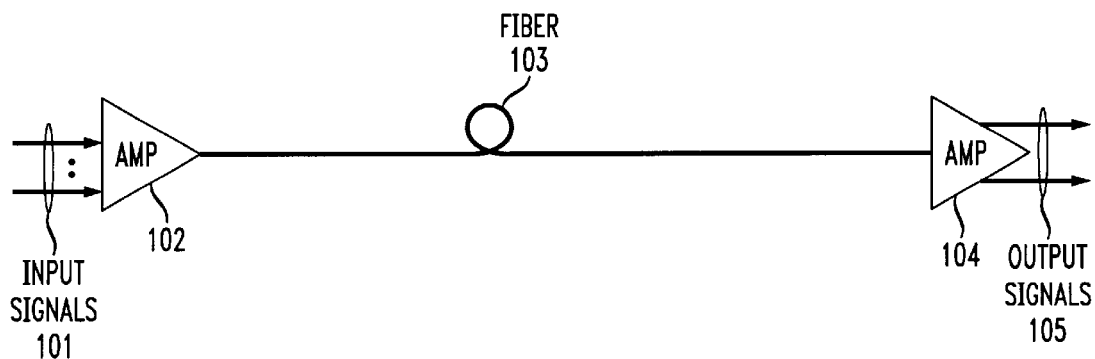
FIG. 1 shows an illustrative block diagram of a prior art optical communication system.

With reference to FIG. 1 we briefly describe an illustrative WDM transmission system. As shown, at the transmitter location a group of WDM signals 101 enter a constant gain amplifier 102 and are launched into fiber 103. At the receiver location, the WDM signals are amplified by amplifier 104 and the resulting WDM signals 105 outputted. With reference to FIG. 4(a), on the left-hand side there is shown, illustratively, the input WDM signals 101, $\lambda_i$–$\lambda_N$, all at a constant power level. On the right-hand side is shown the amplitude of wavelengths of $\lambda_1$–$\lambda_N$ as the output WDM signals 104. The positive slope 401 in the power levels of wavelengths of $\lambda_1$–$\lambda_N$ is caused by the Raman gain tilt which manifest itself as a depletion in the power level of lower wavelength channels or signals e.g., $\lambda_1$, and increase in the power level of higher wavelength channels e.g., $\lambda_N$.

In accordance with the present invention, under a particular set of assumptions, we have analytically solved the Raman equations system to better quantify the Raman gain tilt in WDM transmission systems, such as that shown in FIG. 1. The main assumption is that the Raman gain coefficient $\gamma_{ik}$ between channel i and channel k has a triangular profile (i.e $(\gamma_{ik} \sim (\lambda_k - \lambda_i))$) which indeed closely approximates the Raman gain profile for small (<120 nm) channel spacings (e.g., see A. R. Chraplyvy, "Optical power limits in Multichannel Wavelength-Division-Multiplexed Systems due to Stimulated Raman Scattering," Electron. Left., Vol. 20, 1984, pp. 5859.). We furthermore neglect the energy that is lost whenever a short wavelength photon is transformed into a long wavelength photon (i.e. $\lambda_i/\lambda_k \sim 1$). For a typical WDM system with a maximum channel spacing of 30–40 nm, this is a very minor approximation.

The time independent power evolution of channel k, $S_k$, along the fiber in a N channel system now can be written by $$\frac{dS_k}{dz} = -\alpha S_k + S_k \sum_{i=1}^{N} \frac{\gamma_{ik}}{2A_{eff}} S_i = -\alpha S_k + \beta S_k \sum_{i=1}^{N} (\lambda_k - \lambda_i) S_i \quad 1)$$

$$\text{with } \beta = \frac{\gamma_{ik}}{2A_{eff}(\lambda_k - \lambda_i)}$$

where $A_{eff}$ is the effective core area and the factor 2 is due to random polarization. We also made the usual assumption of uniform loss and negligible noise. It is actually more convenient to write the N coupled differential equations into one equation with two variables $$\frac{dS(z,\lambda)}{dz} = -\alpha S(z,\lambda) + \beta S(z,\lambda) \int_{\lambda_{min}}^{\lambda_{max}} (\lambda - \Lambda) S(z,\Lambda) d\Lambda \quad 2)$$

where we have replaced the N signals by a signal density and the summation by an integration over the entire wavelength spectrum of the signal. Now we divide both sides of 2) by $S(z,\lambda)$ and take the derivative with respect to $\lambda$.

$$\frac{d}{d\lambda} \frac{\frac{dS}{dz}}{S(z,\lambda)} = \beta \int_{\lambda_{min}}^{\lambda_{max}} S(z,\Lambda) d\Lambda \quad 3)$$

the integral in equation 3) is nothing else than the total optical power P which must decay exponentially, thus $$\frac{d}{d\lambda} \frac{\frac{dS}{dz}}{S(z,\lambda)} = \beta P(z) = \beta P_0 \exp(-\alpha z). \quad 4)$$

Where $P_0$ is the total power launched into the fiber at z=0. Now, we integrate with respect to z and then with respect to $\lambda$ and find $$S(z,\lambda) = S(0,\lambda) \exp\{\lambda \beta P_0 L_{eff} + A(\lambda) + F(z)\} \quad 5)$$

with the effective fiber length $L_{eff} = (1-\exp(-\alpha z))/\alpha$ and A and F arbitrary functions that can be determined by requiring that $$\int S(z,\lambda) d\lambda = P_0 \exp(-\alpha z) \quad 6)$$

and $S(z=0,\lambda) = S(0,\lambda)$ which implies immediately that $A(\lambda) = 0$. With 6), we find F(z) and finally $$S(z,l) = \frac{S(0,\lambda) P_0 \exp(-\alpha z)}{\int S(0,\Lambda) \exp\{\beta P_0 L_{eff}(\Lambda - \lambda)\} d\Lambda}. \quad 7)$$

Equation 7) allows us to calculate the power and spectral evolution along the fiber for any given input spectrum $S(0,\lambda)$ and fully accounts for Raman gain saturation effects. As is immediately evident from equation 7), the spectral distortion expressed in dB/nm due to SRS solely depends on the total launched power and effective fiber lengths. Indeed $$\frac{d}{d\lambda} 10\log\left(\frac{S(z,\lambda)}{S(0,\lambda)}\right) = 4.34 \beta P_0 L_{eff} \quad [dB/nm]. \quad 8)$$

Of course, the absolute Raman gain/loss depends on the input power distribution $S(0,\lambda)$. However, the relative difference between two channels of the gain/loss expressed in dBs due to SRS depends only on $P_0$. As a consequence, the gainloss tilt due to SRS in a WDM system can be corrected with a single filter with a linear loss characteristics on a dB/nm scale as long as the total power in the WDM signal is kept constant ($L_{eff}$ is usually not a parameter that can be varied).

One easily verifies that equation 7) reproduces the results for a two channel system by replacing $S(0,\lambda)$ with $N_1\delta(\lambda-\lambda_1)+N_2\delta(\lambda-\lambda_2)$ where the $\delta$ is a Dirac function. (e.g., see M. E. Marhic, F. S. Yang, L. G. Kazovsky, "Cancellation of SRS crosstalk in WDM optical communication an systems by series of parallel techniques," LEOS'97, paper MC2, 1997) or for a three channel system (one pump, two channels) (see W. Jiang, P. Ye, "Crosstalk in Fiber Raman Amplification for WDM Systems," J. of Lightwave, vol. 7, 1989, pp. 1407–1411).

We now calculate the Raman gainloss for several cases. For a dense WDM system with many channels (32, 64 or more), the input power spectrum can be assumed rectangular, i.e. $S(0,\lambda)=S$ for $\lambda_{min}<\lambda<\lambda_{max}$ and $S(0,\lambda)=0$ everywhere else. Equation 7) now becomes $$S(z,\lambda) = \frac{\beta P_0^2 L_{eff} \exp\{-\alpha z\} \exp\{\beta P_0 L_{eff}(\lambda - \lambda_{min})\}}{\exp\{\beta P_0 L_{eff}(\lambda_{max} - \lambda_{min})\} - 1}. \quad 9)$$

By Raman gain/loss $R(z,\lambda)$, we define the gain/loss difference of the signal with and without the stimulated Raman scattering, thus $$R(z,\lambda) = \frac{\beta P_0 L_{eff}(\lambda_{max} - \lambda_{min}) \exp\{\beta P_0 L_{eff}(\lambda - \lambda_{min})\}}{\exp\{\beta P_0 L_{eff}(\lambda_{max} - \lambda_{min})\} - 1}. \quad 10)$$

As an example, let us consider a 80 channel system with 50 GHz optical channel separation. Using illustrative numbers (e.g., from the reference A. R. Chraplyvy, "Limitations on Lightwave Communications Imposed by Optical-Fiber Nonlinearities," J. of Lightwave Technology, vol.8, 1990, 1548–1557), the peak Raman gain is $\gamma=7\times10^{-12}$ cm/W for a channel separation of 15 THz. For a fiber with an active section of $A_{eff}=55$ mm$^2$, this translates into $\beta=4.24\times10^{-7}$ (WcmTHz)$^{-1}$. For a power of 1 mW/channel, with $\alpha=0.2$ dB/km and a span length of 80 km, $\beta P_0 L_{eff}=7.35\times10^{-2}$ (THz)$^{-1}$. The Raman loss for the shortest wavelength channel becomes −0.65 dB, whereas the longest wavelength channel gains 0.62 dB. With 4 mW per channel the short wavelength sides loses −2.8 dB whereas the longest wavelength channel gains 2.3 dB.

Figure 2:
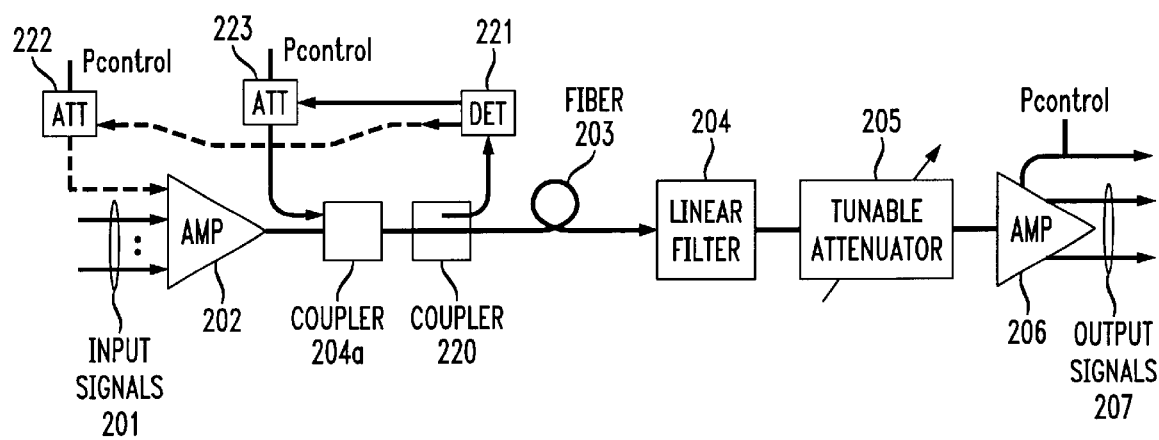
FIG. 2 shows an illustrative block diagram of an optical communication system in accordance with the present invention.
Figure 3:
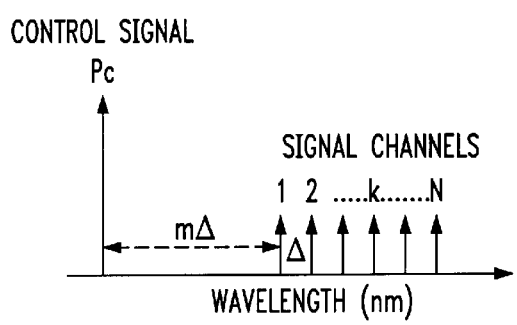
FIG. 3 shows an diagram showing the wavelengths of illustrative control and optical signal channels.

In accordance with the present invention, we now describe a technique for maintaining Raman gain constant in an optical communication system, such as a WDM system. The following description jointly references both FIGS. 2 and 3 In a WDM system of FIG. 2, with N WDM channels, the fractional power gained/lost by Raman scattering of channel k due to the presence of all other channels can be approximated from equation 8). The gain tilt expressed in dB/nm thus depends soley on the total launched power $P_0$. Thus, we propose to maintain the total launched power $P_0$ (also referred to as $P_t$) constant by injecting an additional signal $P_c$ into the fiber along with the signal $P_s$ such that $P_t=P_s+P_c=$constant. With reference to FIG. 2 the additional signal $P_c$ may be injected together with the N signal channels N, 201, into the amplifier 202 for output to fiber 203. Alternatively, the signal $P_c$ may be injected via coupler 204a into fiber 203. FIG. 3 shows an illustrative representation of the power level of control signal and the N channel signals. So as long as the total power, $P_t=P_iN+P_c$, launched into the fiber is constant, the gain tilt will not change and can be corrected once and forever with a single linear filter, 204 of FIG. 2, independent of the system configuration (i.e., the number of communication channels to be used by the system). Thus for example, if the number of channels drops by a factor of 3, then since the total power is constant at $P_t$, and the total signal channel power drops by ⅔ $P_s$, the new power level $P_c'$ of the control signal sent over the fiber 203 is increased to ⅔ $P_s + P_c$ thereby maintaining the total power $P_t$ constant.

If the control signal $P_c$ is directly injected into the amplifier 202, a constant output power optical amplifier can be used, because the control signal keeps the input power to the optical amplifier constant and thus, the saturation constant (power output $P_t$ constant). If the control signal $P_c$ is injected after the amplifier 202, the optical amplifier has to operate in a constant gain regime, in order to keep the power per channel the same independently of how many channels are in the system. The control signal $P_c$ injected after the amplifier 202 would be adjusted such that when it is added to the signal power of the channels $P_s$ outputted from amplifier 202, the total power $P_t$ is maintained constant.

Figure 5:
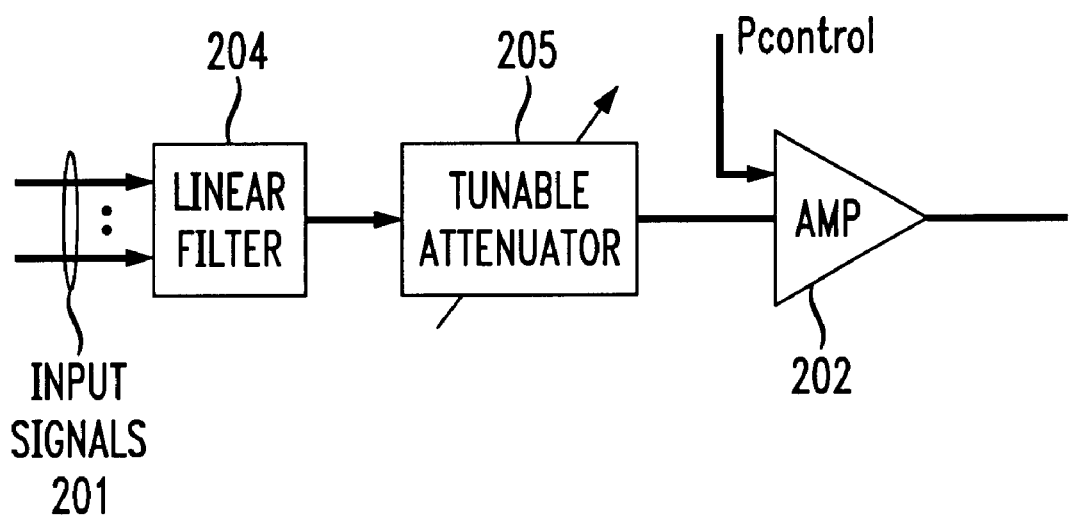
FIG. 5 shows an illustrative arrangement to provide pre-compensation of the optical signal channels.

FIG. 2 illustrates a WDM transmission system that comprises a optical amplifier 202 that always launches the same total signal power $P_t$ into the fiber link 203. According to our invention, the power level of the control signal is adjusted to maintain a constant power $P_t$. At the receiver location, a fixed optical filter 204 corrects for the Raman tilt and a tunable optical attenuator 205 adjusts the power level of received signals. With these three elements, the Raman gain and tilt can be completely corrected for. While FIG. 2 shows a preferred arrangement, it should be noted that the optical filter 204 and tunable optical attenuator 205 may be located at the transmitter location, in front of the amplifier 202 (shown in FIG. 5) to filter and attenuate the WDM signals. Such an arrangement may be used, for example, when pre-compensation of the WDM signals is deemed desirable.

Figure 4:
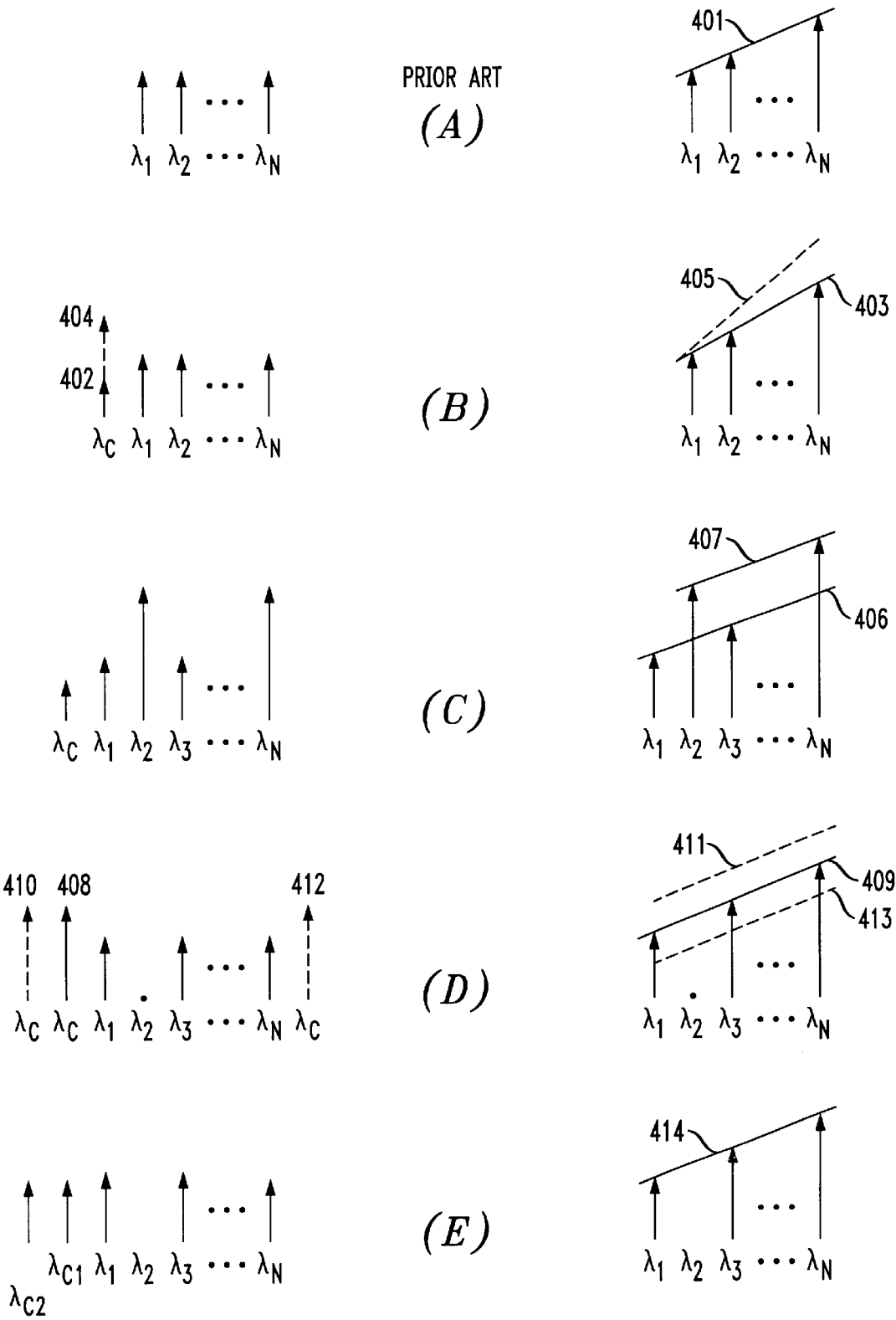
FIGS. 4a through 4e show the resulting Raman tilt produced by a variety of illustrative control signal(s) on a variety of optical signal channels.

With joint reference to FIGS. 2 and 4 we describe other aspects of our invention. In FIG. 4 the horizontal or x axis scale is in nm and the vertical or y axis scale is logarithmic. As shown in FIG. 4$b$ providing a control signal 402, at wavelength $\lambda_C$ and power $P_c$, together with the input WDM signal $\lambda_1 - \lambda_N$ each at a power level $P_i$, results in a received signal 207 which has a Raman tilt 403. As shown, increasing the power of the control signal 404 results in a larger Raman tilt 405. In FIG. 4$c$, it should be noted that the Raman tilt caused by control signal $\lambda_C$ affects all signals $\lambda_1 - \lambda_N$ proportionally, thus received signals $\lambda_1$ and $\lambda_3$ have the same tilt 406 as signals $\lambda_2$ and $\lambda_N$.

As shown in FIG. 4$d$, the wavelength of control signal $\lambda_C$ affects the amplitude of all of the signals $\lambda_1 - \lambda_N$ proportionally. Moreover, when the wavelength of the control signal $\lambda_C$ is made increasingly lower, from 408 to 410, than the wavelengths of the signals $\lambda_1 - \lambda_N$ the amplitude of the received signals $\lambda_1 - \lambda_N$ is increased, from 409 to 411. And when the wavelength of the control signal $\lambda_C$ is made increasingly higher, 412, than the wavelengths of the signals $\lambda_1 - \lambda_N$ the amplitude, 413, of the received signals $\lambda_1 - \lambda_N$ is decreased. Additionally, the control signal can also be located within $\lambda_1 - \lambda_N$ of the channel spectrum, and the channels with the lower wavelengths than the control signal will loose power and the channels with the higher wavelengths will gain power. It should be noted that the control signal can also utilize one of the channel wavelengths. Moreover, the control signal may also be used to carry data.

As shown in FIG. 4$e$, it should be noted that more than one control signal, e.g., $\lambda_{C1}$, and $\lambda_{C2}$, can be used and the resulting tilt 414 would be determined by the combined power of the control signals $\lambda_{C1}$ and $\lambda_{C2}$. Since a laser is used to provide each of the control signals $\lambda_{C1}$ and $\lambda_{C2}$, and lasers are expensive, the preferred mode would be to use only one control signal.

To have the optical amplifier 202 transmit at a constant signal power into the fiber link 203 has advantages beyond ramifications for the Raman gain tilt. Indeed, it has been proposed for eliminating cross-saturation effects in optical networks (e.g., see A. K. Srivastava et al., "Fast-Link Control Protection of Surviving Channels in Multiwavelength Optical Networks," IEEE PTL, vol. 9, December 1997 issue). It can be easily achieved with a pilot laser in each amplifier (see the above-referenced see A. K. Srivastava et al article) or by making the optical amplifier lase on a particular feedback wavelength (see e.g., M. Zirngibl, "Gain control in erbium-doped fiber amplifiers by an all-optical feedback loop," Electron. Lett. Vol. 27, pp. 560–561, 1991) Furthermore, keeping the span loss (including Raman gain/loss) a constant with the tunable attenuator 205 enables a constant gain in the optical amplifier 206, which in turn simplifies the amplifier design for flat gain.

While the present invention has been described for use in a WDM system, it should be noted that it may be utilized in other optical communication systems where Raman tilt is a problem. Moreover, the optical signals may be sub-carrier modulated optical signals or polarized optical signals. Additionally, the optical signals may be intensity modulated (e.g., on/off keying) or amplitude, frequency or phase modulated using well known formats (analog, pulse, or digital). Thus, what has been described is merely illustrative of the application of the principles of the present invention. Other arrangements and methods can be implemented by those skilled in the art without departing from the spirit and scope of the present invention.

What is claimed is:

1. An optical fiber communication system comprising
    a first optical apparatus for transmitting a plurality of optical signals over an optical fiber at a combined power level that does not vary as a function of the number of optical signals transmitted over the fiber,
    a second optical apparatus for filtering the optical signals using an optical filter having a fixed wavelength response to compensate for a gain tilt introduced to the optical signals transmitted over the fiber, and
    wherein the first and second optical apparatuses are located at a transmitter location and the second optical apparatus is connected to an input of the first optical apparatus to pre-compensate optical signals inputted to the first optical apparatus.

2. The system of claim 1 wherein the second optical apparatus includes an attenuator, connected to the optical filter, for adjusting the power level of the optical signals.

3. The system of claim 1 wherein the optical communication signals may be intensity, amplitude, frequency or phase modulated.

4. An optical fiber communication system comprising
    a first optical apparatus for transmitting a plurality of optical signals over an optical fiber at a combined power level that does not vary as a function of the number of optical signals transmitted over the fiber,
    a second optical apparatus for filtering the optical signals using an optical filter having a fixed wavelength response to compensate for a gain tilt introduced to the optical signals transmitted over the fiber, and
    wherein the number of optical signals is at least three including an optical control signal and at least two optical communication signals, having a combined total power level $P_t$, and wherein the power level of the control signal $P_c$ is about equal to said combined power level $P_t$ minus the power levels of the at least two optical communication signals.

5. The system of claim 4 wherein the first optical apparatus is located at a transmitter location and the second optical apparatus is located at a receiver location to filter optical signals received over the fiber.

6. The system of claim 5 wherein the control signal has a shorter wavelength than any of said at least two optical communication signals.

7. The system of claim 5 wherein the control signal has a longer wavelength than any of said at least two optical communication signals.

8. The system of claim 5 wherein the control signal has a wavelength that is located in between the wavelengths of said at least two optical communication signals.

9. The system of claim 5 wherein the system has an optical signal capacity of at least three and at least one optical communication signal is not being used and wherein said control signal has a wavelength equal to a wavelength of one of the at least one optical communication signal which is not being used.

10. An optical fiber communication system comprising a first optical apparatus for transmitting a plurality of optical signals over an optical fiber at a combined power level that does not vary as a function of the number of optical signals transmitted over the fiber, a second optical apparatus for filtering the optical signals using an optical filter having a fixed wavelength response to compensate for a gain tilt introduced to the optical signals transmitted over the fiber, and wherein the number of said optical signals is at least two, all of the optical signals being optical communication signals having a combined total power level $P_t$, and wherein a first optical communication signal has a power level that is about equal to said combined total power level $P_t$ minus the total power level of the remaining at least one optical communication signal of said number of optical signals.

11. An optical fiber communication system comprising a first optical apparatus for transmitting a plurality of optical signals over an optical fiber at a combined power level that does not vary as a function of the number of optical signals transmitted over the fiber, a second optical apparatus for filtering the optical signals using an optical filter having a fixed wavelength response to compensate for a gain tilt introduced to the optical signals transmitted over the fiber, and wherein the number of optical signals includes at least two control signals and at least two optical communication signals, having a combined total power level $P_t$, and wherein the total power level of the at least two control signals is about equal to said combined total power level $P_t$ minus the power levels of the at least two optical signals.

12. An optical fiber communication system comprising a first optical apparatus for transmitting a plurality of optical signals over an optical fiber at a combined power level that does not vary as a function of the number of optical signals transmitted over the fiber, a second optical apparatus for filtering the optical signals using an optical filter having a fixed wavelength response to compensate for a gain tilt introduced to the optical signals transmitted over the fiber, and wherein the system has a transmission capacity of a control signal and N optical communication signals, having a combined transmission power of $P_t$, where N is an integer >1, and wherein when the number of optical communication signals actually transmitted is equal to M, where M is an integer <N, the power level of the control signal $P_c$ is set about equal to $P_t$ minus the combined power of the M transmitted optical communication signals.

13. An optical fiber communication system comprising a first optical apparatus for transmitting a plurality of optical signals over an optical fiber at a combined power level that does not vary as a function of the number of optical signals transmitted over the fiber, a second optical apparatus for filtering the optical signals using an optical filter having a fixed wavelength response to compensate for a gain tilt introduced to the optical signals transmitted over the fiber, and wherein the system is a wavelength division multiplexed (WDM) system having a transmission capacity of N equal power, $P_i$, communication channels, where N is an integer >1, wherein the WDM system also transmits an optical control signal of power $P_c$ over the fiber, and wherein when the number of said channels being used by the WDM system is M, where M is an integer < or=N, then the power $P_c$ of the transmitted control signal is set about equal to C+(N−M) times $P_i$, where C is > zero and is equal to a value of $P_c$ when M equals N.

14. A method of controlling Raman gain tilt in an optical communication system, comprising the steps of at a transmitter location sending a plurality of optical signals at a combined power level Ps over a transmission fiber and sending an optical control signal at a power level Pc over the fiber such that the total power Ps plus Pc is maintained at a predetermined value irrespective of the number of said plurality of optical signals sent over the fiber and at a receiver location filtering the optical signals received over the fiber using an optical filter having a fixed wavelength response to compensate for a gain tilt introduced to the optical signals when they were transmitted over the fiber.

* * * * *